United States Patent Office 2,974,086
Patented Mar. 7, 1961

2,974,086

DERIVATIVES OF 4-PHENYL-2-BUTANONE AS ATTRACTANTS FOR THE MELON FLY

Morton Beroza, Silver Spring, Md., and Benjamin H. Alexander, Washington, D.C., assignors to the United States of America as represented by the Secretary of Agriculture No Drawing. Filed Nov. 6, 1959, Ser. No. 851,484

12 Claims. (Cl. 167—48)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the use of certain synthetic organic compounds for the purpose of attracting melon flies to detect and control local infestations.

Melon flies belong to the species *Dacus cucurbitae* Coq. which occurs in tropical and subtropical areas and constitutes a very serious pest affecting fruits and various vegetables. In the United States this insect is found only in Hawaii, where it has been responsible for extensive damage to agricultural crops. A good melon fly attractant is needed as an aid in preventing the accidental entry of this pest onto the United States mainland from Hawaii or elsewhere.

In order to effect control or eradication of the melon fly, it is necessary to locate the area and degree of infestation. This may be done by setting out traps in suspected areas and placing inside the traps a substance which acts as a bait or attractant for the flies. The bait may be applied to an inert carrier or it may be mixed with a toxic agent which kills all of the flies entering the trap. It is possible to estimate the degree of infestation of a given area from the number of trapped flies. In isolated areas the traps may be used as a method of control.

It is therefore one object of this invention to provide an improved method of detecting and controlling the melon fly. Another object is to provide several novel compounds which have attractant properties superior to those of the attractants currently available.

According to this invention certain derivatives of 4-phenyl-2-butanone have been found to attract the male melon fly either for the purpose of estimating degree of infestation or for purposes of control. It is known that anisylacetone and benzylacetone attract male melon flies; but these compounds have the serious disadvantage that they do not attract young melon flies, that is, those flies which are less than 10 to 12 days old. The compounds herein disclosed attract melon flies immediately after emergence from pupation thus permitting detection of the insect at an earlier stage than is possible with the previous lures and usually prior to the mating of the insect. Furthermore, the new lures are much more attractive and last much longer.

The attractants of this invention are aryl-substituted derivatives of 4-phenyl-2-butanone and may be represented by the general formula

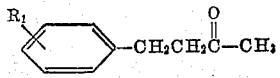

wherein $R_1$ is p-hydroxy, p-acetoxy, p-propionoxy, or p-butyroxy. The esters are prepared from 4-(p-hydroxyphenyl)-2-butanone (Maki, J. Chem. Soc. Japan, Ind. Chem. Sec., 57, 42–44 (1954)), according to the methods described below:

EXAMPLE 1

0.36 mole of acetyl chloride was added while stirring to 0.3 mole 4-(p-hydroxyphenyl)-2-butanone dissolved in 300 ml. dry benzene containing 30 ml. dry pyridine. The temperature was not permitted to rise above 45° C. during this step. After the addition was complete the reaction mixture was allowed to stand overnight.

After standing overnight the reaction mixture was poured into water, the aqueous layer was discarded, and the benzene layer was washed with 5% hydrochloric acid, water, 5% sodium bicarbonate, and a saturated solution of sodium chloride in the stated order. The product was then dried over anhydrous sodium sulphate, the solvent was removed, and the product was distilled. The 4-(p-acetoxyphenyl)-2-butanone recovered boiled at 123–124°/0.2 mm.; $n_D^{25°\,C.}=1.5059$. Theory for $C_{12}H_{14}O_3$: C, 69.99; H, 6.84. Found: C, 69.38; H, 7.13.

Other esters were prepared in a similar manner, using the appropriate acid chloride in place of acetyl chloride: 4-(p-propionoxyphenyl)-2-butanone distilled at 136–139°/0.2 mm., $n_D^{25°}=1.5019$. 4-(p-butyroxyphenyl)-2-butanone distilled at 120–125°/0.09 mm., $n_D^{25°}=1.4998$.

EXAMPLE 2

The compounds were tested in a cage olfactometer to determine their effectiveness. The olfactometer consists of a large chamber, from the ceiling of which a rotating rack is suspended. From the rack there are suspended a number of invaginated flasks, usually twelve. Some of the flasks contain water, while others contain a water emulsion of 0.1 percent of the compound or compounds to be tested. Flies are placed in the chamber and allowed to fly around freely. After a definite period of time the number of flies entering each of the flasks, which act as traps, is counted. The "attractancy rating" is obtained by dividing the number of flies attracted by the compound by the number attracted by the water.

Wick tests were made in the olfactometer by applying 0.5 gram (or 0.5 ml. of liquid) to a 1-inch section of dental roll attached to a kraft-paper rectangle. Six tests can be run simultaneously on a hexagonal rotating device. Each exposure period is limited to 15 minutes. After initial trials, tests were run on the wick aged 1, 7, 14 and 27 days.

Table 1 shows the results obtained in the foregoing tests.

Table 1

ATTRACTIVENESS TO MALE MELON FLIES OF ARYL-SUBSTITUTED 4-PHENYL-2-BUTANONES

| Substituent | Attractancy Rating (Olfactometer) | Wick Test (days) [a] | | | | |
|---|---|---|---|---|---|---|
| | | 0 | 1 | 7 | 14 | 27 |
| p-acetoxy | 34 | 88 | 125 | 400 | 200 | 200 |
| p-propionoxy | 44 | 88 | 125 | 400 | 200 | 200 |
| p-butyroxy | 48 | 125 | 150 | 500 | 200 | 200 |
| p-hydroxy | 20 | [b] 400 | [b] 2,500 | [c] 100 | [c] 75 | [c] 50 |

[a] 4-(p-hydroxyphenyl)-2-butanone=100 except as noted.
[b] Anisylacetone=100.
[c] Actual number caught given, anisylacetone caught none.

EXAMPLE 3

In field tests 10 Steiner plastic traps [J. Econ. Entomol. 50, 508–509 (1957)], were baited with each of the better lures. All traps contained a lindane-chlordane mix to assist in fly kill. The lures and the total number of insects caught in 14 days follow:

Table 2

| | |
|---|---|
| Anisylacetone | 746 |
| 4-(p-hydroxyphenyl)-2-butanone | 8,297 |
| 4-(p-acetoxyphenyl)-2-butanone | 15,692 |
| 4-(p-propionoxyphenyl)-2-butanone | 10,377 |
| 4-(p-butyroxyphenyl)-2-butanone | 5,561 |

The attractants can be used in actual practice in the field in traps either as an aqueous emulsion or impregnated in an absorbent material such as a dental roll. They can also be used, usually on a carrier, in admixture with substances known to be toxic to the fruit fly such as parathion, malathion, DDVP (dimethyl 2,2-dichlorovinyl phosphate), dieldrin, aldrin and the like.

We claim:

1. A method of detecting and controlling infestations of melon fly which comprises baiting a trap with an attractant selected from the group consisting of 4-(p-hydroxyphenyl) - 2 - butanone, 4 - (p - acetoxyphenyl) - 2- butanone, 4-(p-propionoxyphenyl)-2-butanone, and 4-(p-butyroxyphenyl)-2-butanone.

2. The method of claim 1 wherein the attractant is impregnated in an adsorbent material.

3. The method of claim 1 wherein the attractant is mixed with a toxicant for the melon fly.

4. The method of claim 1 wherein the attractant is 4-(p-hydroxyphenyl)-2-butanone.

5. The method of claim 1 wherein the attractant is 4-(p-acetoxyphenyl)-2-butanone.

6. The method of claim 1 wherein the attractant is 4-(p-propionoxyphenyl)-2-butanone.

7. The method of claim 1 wherein the attractant is 4-(p-butyroxyphenyl)-2-butanone.

8. A composition for controlling the melon fly comprising a toxicant and an attractant selected from the group consisting of 4-(p-hydroxyphenyl)-2-butanone, 4 - (p - acetoxyphenyl) - 2 - butanone, 4 - (p - propionoxyphenyl)-2-butanone, and 4-(p-butyroxyphenyl)-2-butanone.

9. The composition of claim 8 wherein the attractant is 4-(p-hydroxyphenyl)-2-butanone.

10. The composition of claim 8 wherein the attractant is 4-(p-acetoxyphenyl)-2-butanone.

11. The composition of claim 8 wherein the attractant is 4-(p-propionoxyphenyl)-2-butanone.

12. The composition of claim 8 wherein the attractant is 4-(p-butyroxyphenyl)-2-butanone.

References Cited in the file of this patent

Maki: Jour. Chem. Soc. Japan, Ind. Chem. Sec., 57 42–44 (1954).